US005664363A

United States Patent [19]

Keenan

[11] Patent Number: 5,664,363
[45] Date of Patent: Sep. 9, 1997

[54] INSTANT RECHARGEABLE COATING FOR FISHING TACKLE AND METHOD

[76] Inventor: Alexander J. Keenan, 11001 Totem Rd., Anchorage, Ak. 99516

[21] Appl. No.: 629,190

[22] Filed: Apr. 8, 1996

Related U.S. Application Data

[63] Continuation-in-part of Ser. No. 247,267, May 23, 1994, Pat. No. 5,505,939.

[51] Int. Cl.$^6$ .................................................... A23K 1/18
[52] U.S. Cl. ...................... 43/42.06; 43/42.5; 424/84; 427/202; 427/220; 427/385.5; 427/386; 427/388.1; 428/424.7; 428/425.1; 428/425.9; 428/413; 428/418; 428/480; 428/482; 428/507
[58] Field of Search ................... 43/42.06, 42.5, 43/43.12, 44.2, 44.4; 428/424.7, 425.1, 425.9, 413, 418, 480, 482, 507; 427/202, 220, 386, 388.1, 385.5; 424/84

[56] References Cited

U.S. PATENT DOCUMENTS

| | | | |
|---|---|---|---|
| 4,090,013 | 5/1978 | Ganslaw et al. | 526/15 |
| 4,155,893 | 5/1979 | Fujimoto et al. | 526/328 |
| 4,245,420 | 1/1981 | Carr | 43/42.06 |
| 4,366,206 | 12/1982 | Tanaka | 428/373 |
| 4,389,513 | 6/1983 | Miyazaki | 525/186 |
| 4,731,247 | 3/1988 | Wolford et al. | 426/1 |
| 4,826,691 | 5/1989 | Prochnow | 43/42.39 X |
| 4,887,376 | 12/1989 | Sibley et al. | 43/42.06 |
| 4,927,643 | 5/1990 | D'Oranzio et al. | 43/42.06 |
| 4,962,609 | 10/1990 | Walker | 43/42.07 |
| 4,993,183 | 2/1991 | Carver | 43/42.06 |
| 5,026,596 | 6/1991 | Saotome | 428/406 |
| 5,146,707 | 9/1992 | Nichols | 43/42.53 |
| 5,374,600 | 12/1994 | Hozumi et al. | 502/402 |
| 5,393,537 | 2/1995 | Rawlins | 426/1 |

FOREIGN PATENT DOCUMENTS 3-297340  12/1991  Japan .......................... 43/42

OTHER PUBLICATIONS

"Relative Lightweights" by Deborah Erickson *Scientific American*, May 1992, pp. 128–129.

*Primary Examiner*—Mark D. Sweet
*Attorney, Agent, or Firm*—Palmer C. DeMeo

[57] ABSTRACT

The present invention pertains to an absorbent coating and method for coating a fishing tackle item which absorbent coating will absorb a liquid fish attractant or attractants on contact by utilizing polymer and/or copolymer particles that are applied over a finish coating on the fishing tackle item while the finish coating is in a liquid state.

43 Claims, No Drawings

INSTANT RECHARGEABLE COATING FOR FISHING TACKLE AND METHOD

This application is a continuation-in-part of patent application Ser. No. 08/247,267 filed on May 23, 1994, now U.S. Pat. No. 5,505,939.

BACKGROUND OF THE INVENTION

1. Field of the Invention

The present invention pertains to an absorbent coating and more particularly to applying said absorbent coating to fishing tackle where said absorbent coating will absorb a liquid fish attractant or attractants on contact.

2. Description of the Prior Art

It has been widely accepted that fish respond to scented attractants as well as visual stimuli. Many liquid scented attractants are currently being sold on the commercial market. But a continuing problem has been in getting the attractant to stay on the fishing tackle. In order to solve this problem, gelling agents and other thickeners have been used in many commercially available attractants. U.S. Pat. No. 4,927,643 discloses one example of a soluble fish-attractant coating wherein cross-linked polymers are formed and act as gelling agents. But there is no means to enable the gel to stay on the fishing tackle. When oils are used in this gel they must be selected when the gel is made and can not be selected by the fisher person. It would be desirable to select a cross-linked polymer or copolymer that would absorb liquid scented attractants. Liquid scented attractants would function as a plasticizer. One familiar with rubber compounds will be aware of how rubbers can absorb solvents and swell to several times their normal size.

Fishing lures have been made wherein fish attractants are blended into the material they are made from. Several examples of scented attractants that are incorporated into the fishing lure material are disclosed in the Hasting's patent, U.S. Pat. No. 4,589,223 and in the Carr patent, U.S. Pat. No. 4,245,420. However, natural oils and fish attractants can become rancid. Packaging items that contain liquid fish attractants can leak and become smelly. Scented attractants have limited shelf life. With so many liquid fish attractants on the market, it would be advantageous to make fishing tackles that would accept any liquid fish attractant.

Different fibers and compounds have been added to fishing lures to allow them to absorb liquid fish attractants. For example, U.S. Pat. No. 4,962,609 (Walker) discloses a fiber coating used to hold liquid scented attractants. Coating fishing lures and hooks with fibers and other natural absorbent materials can detract from from their visual appearance. Many of these coatings depend only on capillary attraction. They are very limited as to what liquids they can hold. Textures of finished products can not be changed.

U.S. Pat. No. 5,026,596 to Saotome and U.S. Pat. No. 4,389,513 to Miyazaki clearly show that cross-linked polymers only bond well to porous items when the polymer is formed on an item. Another method must be found to form a strong bond that will not loosen when a plasticizer is applied.

U.S. Pat. No. 4,826,691 to Prochnow discloses the use of a gelatinous membrane film on the surface of a fishing lure wherein said film is blended from mucilaginous polymeric materials and powdered marine life attractants. However, unlike the present invention, all of the polymeric materials disclosed for use in the Prochnow patent are below the gel point since they all dissolve in water.

SUMMARY OF THE INVENTION

The present invention pertains to a method for coating fishing tackle which will absorb liquid attractants and attractants on contact and to the coating per se. This invention presents a simple coating method that can be added to many existing production processes. While being simple the coating and process allow for a wide range of materials that can be used and also allow for a wide range of fishing tackle. Lures, weights, spoons, hooks, etc., are some examples of fishing tackle that can be coated by the method disclosed herein. By using cross-linked polymer and/or copolymer particles a wide range of textures and rates of absorbency is possible. Also, since many of the polymer and/or copolymer particles used in my process are expandable the variety of fishing tackle is increased. A manufacturer can easily produce an item with a desired texture for a specific attractant for a specific type of fish. Since most of the polymer and/or polymer particles used in my invention have indefinite shelf lives, the fishing product can keep for years and still be as usable as the day it was made. One of the primary objects of this invention is to be able to recharge a fishing tackle item with a liquid fish attractant after each time that it has been used without the absorbent coating of the fishing tackle item dissolving in water.

Accordingly, besides the objects and advantages of the absorbent coating described above, other objects and advantages of the present invention are:

a) to provide a coating that takes advantage of the fact that many fishing lures and tackle have some type of finished coating that is in a liquid state when applied;

b) to provide a coating that gives greater flexibility in both the attractant that can be used and the texture of the final product;

c) to provide a coating that can be easily added to an existing manufacturing process;

d) to provide a coating where the rate of absorption of a liquid attractant can be controlled;

e) to provide a coating that can absorb a single liquid, selected liquids or a wide range of liquids;

f) to provide a coating that can give a soft body or a slimey finish to otherwise a hard finished tackle; and g) to provide a coating with a long shelf life.

DESCRIPTION OF THE PREFERRED EMBODIMENTS

The coating process takes advantage of advances in absorbent type polymers. There are a number of polymers or copolymers that will absorb 30+ times their weight of a liquid on contact. The coating is a two step process.

a) First, a liquid finish is applied to the desired item of fishing tackle.

b) Then, a dry absorbent or mix of absorbent particles (polymers and/or copolymers) is applied to the liquid finish while the liquid finish is still in the liquid state.

Only part of each absorbent particle will absorb some of the finish. Each absorbent particle will be bound to the finish and, therefore, to the item of fishing tackle when the finish dries or cures.

A liquid finish can be applied to the item of fishing tackle by spraying, brushing, pad printing or any other method that will apply a liquid finish to the desired area of the item of fishing tackle. The liquid finish can be any liquid that will:

a) bind to the desired item of fishing tackle upon drying or curing;

b) be absorbable by the absorbent particles being used;

c) cure or dry with a layer of absorbent particles adhering to it;

d) allow the liquid absorbed by the absorbent particles to dry or cure; and e) not dissolve when a liquid attractant is added to or placed in water or liquid attractant after drying or curing.

The liquids of my invention fall into two groups:

a) Self curing resins. Epoxies and polyesters are examples of these.

b) Liquids that must dry or harden. Examples of these are: lacquers, varnish shellacs, urethanes, acrylics, enamels, hydrocarbon and water based paints.

Absorbent particles can be applied to the liquid finish by air spraying, pouring, dipping, or any other method that will apply a desired coating of the absorbent to the finish. The size of the particles will determine the method of application. Absorbent particles can range from several microns in diameter to half an inch in diameter. The particles can vary in shape from flat disks to round spheres. An absorbent particle can be any polymer or copolymer that will:

a) absorb a liquid finish;

b) allow a finish to dry or cure both on the item of fishing tackle and in the absorbent;

c) stay bound to the item of fishing tackle through the dried or cured finish;

d) absorb several times its weight in the desired attractant; and e) absorb liquids without chemically changing the liquid which is absorbed.

The absorbent particles used in this invention fall into two groups:

a) lipidphilic polymer or copolymer, alkystyrene copolymer, olefinic copolymer, and elastomer;

b) hydrophilic polymer or copolymer, amphoteric (anionic and cationic monomers); anionic (carboxylate, sulfonate, phosphonate); cationic (ammine, quatenary ammonium salts); non-ionic (amide, lactam, hydroxyl, polyether);and zwitterionic (monomers having both cation and anion groups).

Specific hydrophilic, absorbent polymers and copolymers that are commercially available and used in this invention are: sodium carboxymethyl cellulose, poly (acrylic acid) salts, poly (ether)-based non-ionic xerogellants, carboxymethyl cellulose fibers, polyacrylate, polyacrylonitrile, hydrollyzed polyacrylonitrile, poly (vinyl alcohol-sodium) acrylate and poly (isobutylene-co-disodium) maleate.

Examples of these absorbent particles are disclosed in: U.S. Pat. No. 4,389,513, H. Miyazaki, Jun. 21, 1983; U.S. Pat. No. 4,155,893, M. Fugimoto, T. Tamura, and T. Nagase, May 22, 1979; U.S. Pat. No. 4,366,206, K. Tanaka, Dec. 28, 1982; U.S. Pat. No. 4,090,013, S. H. Ganslaw and H. G. Katz, May 16, 1978, alkystyrene copolymer Imbiber Beads produced by Imbibtive Technologies; and olefinic copolymer expandabeads produced by Big 'O' Inc.

The absorbent particles used in this invention are lightly cross-linked polymers and copolymers. The greater the cross-linking, the less liquid will be absorbed but the greater the gel strength. The fewer the cross-linking, the greater will be the absorption of liquids but the weaker the gel. Cross-linking can be reduced until there are so few cross-links that the absorbent becomes soluble in liquid. By controlling the cross-linking of the absorbent or absorbents used, the rate of absrption of the attractant can be controlled. Also, after the attractant is applied, the texture of the coating can vary from a hard surface to a soft gel. The coating can also be a combination of desired textures. The coating can contain particles to absorb one liquid such as fish oil and other particles to absorb another liquid such as water or blood. The absorbents can be selected to absorb only certain selected liquids and no others.

Cross-linked polymers or copolymers can be expanded. An expanded absorbent yields a greater rate of absorption while maintaining the same strength and texture of an unexpanded particle when a desired liquid is applied. Many techniques are known for expanding polymers ranging from blowing agents to freeze drying. The absorbent can be expanded before its application or it can be expanded after its application. The following are several methods which have been used to expand absorbents:

a) The use of a blowing agent has been well known as a method for expanding cross-linked polymers.

b) Richard W. Pekala, a leader at the Lawrence Livermore National Laboratory polymeric materials section, has shown that cross-linked polymers can be expanded by expanding the absorbent with an organic solvent, which is replaced by liquid carbon dioxide, then high pressure is applied to transform the carbon dioxide into a supercritical fluid. The pressure is slowly released allowing the carbon dioxide to gasify leaving an expanded absorbent.

c) Freeze drying has also been used to expand an absorbent. The absorbent is expanded with a solvent and then freeze dried.

Polymer or copolymer particles can become clear to translucent when fully absorbed with a liquid attractant. This will improve the visual qualities of the fishing tackle by allowing colors to show through. Transparency will depend on particle size and on which polymers or copolymers are used.

It is desirable that the polymer or copolymer absorbent coating of the instant invention not dissolve in water or in a liquid attractant especially after the fishing tackle item has been used over and over again. This objective is accomplished by selecting polymers or copolymers that have enough cross-linking such that the polymer or copolymer does not dissolve when placed in a liquid. Instead of dissolving when placed in a liquid, the polymer or copolymer is formed into a gel. More specifically, all the polymers or copolymers used in the absorbent coating of this invention are cross-linked above their respective gel point. As a result of using these particular polymers and copolymers in the absorbent coating of the fishing tackle item, further advantages ensue such as:

a) a textured coating can be formed when a liquid fish attractant is added to the absorbent polymer or copolymer absorbent coating;

b) any change in the nature of the liquid fish attractant is prevented;

c) the absorbent coating can be recharged after the liquid fish attractant has dried or evaporated out of the coating; and d) the absorbent coating is prevented from dissolving in the liquid finish that bonds the coating to the item of fishing tackle.

An example of use is a salmon hook coated with a layer of epoxy resin and then with a layer of 500 micron diameter expandabeads. The hook is allowed to cure. Once the epoxy is cured, the expandabeads bond to the hook. Now the hook can be stored for several years. Before being used, the hook is coated with anise, herring or other liquid attractant. The expandabeads absorb the attractant. The hook will now have a soft layer holding the desired attractant. This hook will now have a superior taste and texture compared to an uncoated hook.

Modifications of this invention will be readily apparent to those skilled in the art and it is intended that the invention be not limited by the embodiments disclosed herein but that the scope of the invention be defined by the appended claims.

What is claimed is:

1. A fishing tackle item having thereon an absorbent coating prepared by the method comprising:
   a) applying a liquid finish coating to said fishing tackle item wherein said liquid finish coating is selected from the group consisting of enamels, epoxies, lacquers, urethanes, acrylics, polyesters, varnish, shellacs, and hydrocarbon and water based paints,
   b) applying a polymer or copolymer to said liquid finish coating wherein said polymer or copolymer is selected from the group consisting of sodium carboxymethyl cellulose, poly (acrylic acid) salts, poly (ether)-based non-ionic xerogellants, carboxymethyl cellulose fibers, polyacrylate, polyacrylonitrile hydrollyzed polyacrylonitrile, poly (vinyl alcohol-sodium) acrylate and poly (isobutylene-co-disodium) maleate, said polymer or copolymer absorbing said liquid finish coating and a predetermined liquid fish attractant wherein said polymer or copolymer comprises particles that are applied to said liquid finish coating while said finish coating is in the liquid state and wherein said polymers and copolymers are all cross-linked above their respective gel point so that they do not dissolve in water; and
   c) curing or drying said liquid finish coating in the absorbent polymer or copolymer particles preventing that part of the absorbent polymer or copolymer particles from absorbing any other liquid and bonding the absorbent polymer or copolymer particles to said fishing tackle item.

2. The fishing tackle item of claim 1 wherein said polymer or copolymer particles absorb said liquid finish coating and said liquid fish attractant on contact.

3. The fishing tackle item of claim 2 wherein said liquid finish coating adheres to said item being coated and to said particles upon curing or drying.

4. The fishing tackle item of claim 3 wherein the size of said particles range from several microns to one-half inch.

5. The fishing tackle item of claim 4 wherein said particles are applied to said finish coating by one of several methods selected from the group consisting of dipping, air brushing at low pressure and pouring.

6. The fishing tackle item of claim 5 wherein areas of said item that said particles adhere to are controlled by controlling areas of said item that are covered by said liquid finish coating.

7. The fishing tackle item of claim 6 wherein said particles absorb said liquid finish coating and said liquid fish attractant without chemically changing said liquid finish coating and said liquid fish attractant that are absorbed.

8. The fishing tackle item of claim 1 wherein said fishing tackle item can be stored for several years and will readily absorb said liquid fish attractant when exposed to it.

9. The fishing tackle item of claim 1 wherein said polymer or copolymer comprises particles absorb a wide range of liquid fish attractants allowing a fisher person to select said liquid fish attractant.

10. The fishing tackle item of claim 9 wherein said liquid fish attractant comprises a natural oil.

11. The fishing tackle item of claim 9 wherein said liquid fish attractant comprises an aqueous solution.

12. The fishing tackle item of claim 9 wherein said liquid fish attractant comprises a natural oil and an aqueous solution.

13. The fishing tackle item of claim 1 wherein said absorbent coating provides a base for said fishing tackle item for the application of said liquid fish attractant to adhere to said item instead of running off of said item.

14. The fishing tackle item of claim 1 wherein said polymer or copolymer particles are selected so that said finish or absorbent coating becomes translucent upon absorbing said liquid fish attractant allowing color of said finish coating to show through.

15. The fishing tackle item of claim 1 wherein desired gel characteristics of said absorbent coating are achieved by adjusting the degree of cross linking of the polymer or copolymer particles by
   a) decreasing the mount of cross linking to decrease its strength, increase its rate of absorption and soften its gel characteristics or
   b) increasing the mount of cross linking to increase its strength, decrease its rate of absorption and harden its gel characteristics.

16. The fishing tackle item of claim 15 wherein said absorbent coating is made from different polymer or copolymer particles such that different coating textures, from a soft gel to a hard plastic, are obtained upon absorbing said liquid fish attractant.

17. The fishing tackle item of claim 15 wherein said polymer or copolymer particles are a mixture of different polymer or co-polymer particles such that each polymer or copolymer particle absorbs a different liquid fish attractant or liquid fish attractants at different rates.

18. The fishing tackle item of claim 1 wherein said polymer or copolymer particles are expanded to a particular volume before or after bonding to said item of fishing tackle to increase the rate of absorption of said liquid finish coating and said liquid fish attractant by the use of blowing agents, freeze drying, or aerogel processes.

19. The fishing tackle item of claim 1 wherein said item of fishing tackle is selected from the group consisting of lures, weights, spoons and hooks.

20. The fishing tackle item of claim 1 wherein said absorbent coating of said fishing tackle item can be recharged after said absorbent coating loses said liquid fish attractant due to evaporation or leaching out by reapplying said liquid fish attractant.

21. The fishing tackle item of claim 1 wherein said polymer or copolymer particles have the shape of spheres or flat disks.

22. A method of making an absorbent coating for an item of fishing tackle made by the following steps:
   a) providing an item of fishing tackle,
   b) applying a liquid finish coating to said item of fishing tackle wherein said liquid finish coating is selected from the group consisting of enamels, epoxies, lacquers, urethanes, acrylics, polyesters, varnish, shellacs, and hydrocarbon and water based paints,
   c) applying a polymer or copolymer to said liquid finish coating wherein said polymer or copolymer is selected from the group consisting of sodium carboxymethyl cellulose, poly (acrylic acid) salts, poly (ether)-based non-ionic xerogellants, carboxymethyl cellulose fibers, polyacrylate, polyacrylonitrile, hydrollyzed polyacrylonitrile, poly (vinyl alcohol-sodium) acrylate and poly (isobutylene-co-disodium) maleate, said compound absorbing said liquid finish coating and a predetermined liquid fish attractant wherein said polymer or copolymer comprises particles that are applied to said liquid finish coating while said finish coating is in a liquid state and wherein said polymers and copolymers are all cross-linked above their respective gel point so that they do not dissolve in water; and d) curing or drying said liquid finish coating in the absorbent polymer or copolymer particles preventing that part of the absorbent polymer or copolymer from absorbing any other liquid and bonding the absorbent polymer or copolymer particles to said item of fishing tackle.

23. The method of claim 22 wherein said polymer or copolymer particles absorb said liquid finish coating and said liquid fish attractant on contact.

24. The method of claim 23 wherein only a percentage of said particles of each of said polymer or copolymer particles absorbs said liquid finish coating.

25. The method of of claim 24 wherein said liquid finish coating adheres to said item being coated and to said particles upon curing or drying.

26. The method of claim 25 wherein the size of said particles range from several microns to one-half inch.

27. The method of claim 26 wherein said particles are applied to said finish coating by one of several methods selected from the group consisting of dipping, air brushing at low pressure and pouting.

28. The method of claim 27 wherein areas of said item that said particles adhere to are controlled by controlling areas of said item that are covered by said liquid finish coating.

29. The method of claim 28 wherein said particles absorb said liquid finish coating and said liquid fish attractant without chemically changing said liquid finish coating and said liquid fish attractant that are absorbed.

30. The method of claim 22 wherein said item of fishing tackle is stored for several years and will readily absorb said liquid fish attractant when exposed to it.

31. The method of claim 22 wherein said polymer or copolymer particles absorb a wide range of liquid fish attractants allowing a fisher person to select said liquid fish attractant.

32. The method of claim 31 wherein said liquid fish attractant comprises a natural oil.

33. The method of claim 31 wherein said liquid fish attractant comprises an aqueous solution.

34. The method of claim 31 wherein said liquid fish attractant comprises a natural oil and an aqueous solution.

35. The method of claim 22 wherein said absorbent coating provides a base for said item of fishing tackle for the application of said liquid fish attractant to adhere to said item instead of running off of said item.

36. The method of claim 22 wherein said polymer or copolymer particles are selected so that said finish or absorbent coating becomes translucent upon absorbing said liquid fish attractant allowing color of said finish coating to show through.

37. The method of claim 22 wherein desired gel characteristics of said absorbent coating are achieved by adjusting the degree of cross linking of the polymer or copolymer particles by a) decreasing the mount of cross linking to decrease its strength, increase its rate of absorption and soften its gel characteristics or b) increasing the mount of cross linking to increase its strength, decrease its rate of absorption and harden its gel characteristics.

38. The method of claim 37 wherein said absorbent coating is made from different polymer or copolymer particles such that different coating textures, from a soft gel to a hard plastic, are obtained upon absorbing said liquid fish attractant.

39. The method of claim 37 wherein said polymer or copolymer particles are a mixture of different polymer or copolymer particles such that each polymer or copolymer particle absorbs a different liquid fish attractant or liquid fish attractants at different rates.

40. The method of claim 22 wherein said polymer or copolymer particles are expanded to a particular volume before or after bonding to said item of fishing tackle to increase the rate of absorption of said liquid finish coating and said liquid fish attractant by the use of blowing agents, freeze drying, or aerogel processes.

41. The method of claim 22 wherein said item of fishing tackle is selected from the group consisting of lures, weights, spoons and hooks.

42. The method of claim 22 wherein said absorbent coating of said item of fishing tackle can be recharged after said absorbent coating loses said liquid fish attractant due to evaporation or leaching out by reapplying said liquid fish attractant.

43. The method of claim 22 wherein said polymer or copolymer particles have the shape of spheres or flat disks.

* * * * *